(12) United States Patent
Tabata (10) Patent No.: US 8,169,634 B2
(45) Date of Patent: May 1, 2012

(54) IMAGE PROCESSING APPARATUS AND IMAGE FORMING APPARATUS

(75) Inventor: Sunao Tabata, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 423 days.

(21) Appl. No.: 12/364,889

(22) Filed: Feb. 3, 2009

(65) Prior Publication Data
US 2009/0136088 A1 May 28, 2009

Related U.S. Application Data

(62) Division of application No. 11/081,935, filed on Mar. 17, 2005, now abandoned.

(51) Int. Cl.
G06K 15/00 (2006.01)
G06F 3/12 (2006.01)
(52) U.S. Cl. ............... 358/1.14; 358/1.15; 382/100
(58) Field of Classification Search .............. 358/1.15
See application file for complete search history.

(56) References Cited

U.S. PATENT DOCUMENTS

| | | | |
|---|---|---|---|
| 6,477,431 B1 | 11/2002 | Kalker et al. | |
| 6,505,223 B1 | 1/2003 | Haitsma et al. | |
| 6,724,912 B1 * | 4/2004 | Carr et al. | 382/100 |
| 6,865,589 B2 | 3/2005 | Haitsma et al. | |
| 6,971,011 B1 | 11/2005 | Maes | |
| 7,146,394 B2 | 12/2006 | Haitsma et al. | |
| 7,191,334 B1 | 3/2007 | Kalker | |
| 7,259,878 B2 * | 8/2007 | Ishida et al. | 358/1.14 |
| 2002/0129255 A1 * | 9/2002 | Tsuchiyama et al. | 713/176 |
| 2003/0035565 A1 * | 2/2003 | Rhoads | 382/100 |
| 2004/0136562 A1 | 7/2004 | Sarraf et al. | |
| 2004/0174555 A1 | 9/2004 | Tabata et al. | |
| 2004/0230802 A1 * | 11/2004 | Moon | 713/176 |
| 2005/0066172 A1 | 3/2005 | Vorbruggen et al. | |
| 2006/0124016 A1 * | 6/2006 | Schaede | 101/494 |
| 2006/0257628 A1 * | 11/2006 | Cooper | 428/156 |
| 2008/0267515 A1 * | 10/2008 | Harrington | 382/233 |

FOREIGN PATENT DOCUMENTS

| | | | |
|---|---|---|---|
| EP | 0 982 927 | * | 1/2000 |
| EP | 0 982 927 A1 | | 3/2000 |
| JP | 2000-078125 A | | 3/2000 |
| JP | 2001-203882 A | | 7/2001 |
| JP | 2002-503431 A | | 1/2002 |
| JP | 2002-247339 A | | 8/2002 |

(Continued)

OTHER PUBLICATIONS

U.S. Appl. No. 11/081,023, filed Mar. 16, 2005, Tabata.
U.S. Appl. No. 11/081,938, filed Mar. 17, 2005, Tabata.

Primary Examiner — Twyler Haskins
Assistant Examiner — Helen Q Zong
(74) Attorney, Agent, or Firm — Foley & Lardner LLP (57) ABSTRACT

In a watermark process section in an image processing apparatus, a visible watermark pattern read-out section reads out a visible watermark pattern that is stored in a memory. An invisible watermark generating section draws an invisible watermark on the read-out visible watermark pattern. Image data, which includes both the visible watermark and drawn invisible watermark, is multiplied by an overlay ratio. An adder section adds the visible/invisible watermark image data, which is multiplied by the overlay ratio, and input image data. Thus, watermark-overlaid image data is generated.

6 Claims, 9 Drawing Sheets

FOREIGN PATENT DOCUMENTS

| | | |
|---|---|---|
| JP | 2003-228560 A | 8/2003 |
| JP | 2004-007463 A | 1/2004 |
| JP | 2004-056224 A | 2/2004 |
| JP | 2004-118296 A | 4/2004 |
| JP | 2004-153568 A | 5/2004 |
| WO | WO 00/07356 A2 | 2/2000 |

* cited by examiner

Visible watermark    Overlay of invisible watermark

IMAGE PROCESSING APPARATUS AND IMAGE FORMING APPARATUS

The present application is a divisional of U.S. application Ser. No. 11/081,935, filed Mar. 17, 2005, the entire contents of which is incorporated herein by reference.

BACKGROUND OF THE INVENTION

1. Field of the Invention

The present invention relates to an image processing apparatus that processes image data such as a visible watermark and an invisible watermark, and to an image forming apparatus and method.

2. Description of the Related Art

In the prior art, with developments in digital technology, a great number of documents have been digitized, and management of such digitized documents has posed an important problem.

In the case of complete digital image data, techniques relating to high-robustness watermarks and retrieval methods are important. However, there is a demand for further techniques in the case of a system, such as a copier, wherein information is handled in a printed medium form and an electronic data form, and a complete digital architecture cannot be adopted.

For instance, the following documents disclose related techniques:

Document 1: Jpn. Pat. Appln. KOKAI Publication No. 2001-203882,

Document 2: Jpn. Pat. Appln. KOKAI Publication No. 2004-7463,

Document 3: Jpn. Pat. Appln. KOKAI Publication No. 2003-228560, and

Document 4: Jpn. Pat. Appln. KOKAI Publication No. 2004-118296.

In the technique disclosed in Document 1, the threshold for error diffusion is cyclically altered, and print data is generated by breaking the cyclically only at a watermark part. Thereby, the watermark is made invisible in ordinary print data. If a cyclic pattern using error diffusion is overlaid on the print data, the watermark image can be made visible.

In the technique disclosed in Document 2, two kinds of watermarks with different anti-attack robustnesses are buried in a copy output. Thus, at the time of input, it is determined whether a document is the original or a copy.

In the technique disclosed in Document 3, different information items are buried in a structured electronic document. Invisible watermark data is buried in an image or the like, and a tag is buried in structured data.

In the technique disclosed in Document 4, an image input/output apparatus and a document management server are made to cooperate to make a search as to whether input image data is present in the document management server. If an original document is present, not input data but data in the document management server is printed out.

In ordinary use of a watermark, a watermark that is invisible is buried to prevent/detect tampering. When a specific requirement is met, the watermark is made visible. In recent years, however, in some uses, a watermark in a visible state is overlaid on an image from the beginning, thereby demonstrating that image data is output from a specific apparatus and preventing tampering. In the case of an invisible watermark, digital management is presupposed. However, in the case of a visible watermark that is directly drawn on an image, even if an original with a visible watermark is copied by an analog copier, it is possible, even thereafter, to specify the apparatus that outputs the original by directly viewing the printed matter.

In the method of Document 1, however, the presence/absence of a watermark is not understandable unless a specific process is executed. In addition, a margin that occupies a major part of a copy document is large, and it is difficult to apply this method to a document that substantially comprises characters. In the method of Document 2, different kinds of watermarks are buried to determine whether the document is a copy or not. However, both watermarks are invisible ones, and it is difficult to apply the watermarks to a document with a large margin.

In the method of Document 3, only one of two kinds of information items can be laid on the print data, and it is difficult to apply this method to a copier. The technique of Document 4 is different from the technique of a watermark, and print data is made to cooperate with document management. An OCR, etc. is used for specifying a document, and it is difficult to specify various kinds of input original documents with high precision.

BRIEF SUMMARY OF THE INVENTION

The object of an aspect of the present invention is to provide an image processing apparatus and an image forming apparatus and method, which can overlay a watermark on various kinds of image data and can simplify document management.

According to an aspect of the present invention, there is provided an image processing apparatus comprising: a memory section that stores image data of a visible watermark pattern; a read-out section that reads out the image data of the visible watermark pattern that is stored in the memory section; an invisible watermark generating section that draws an invisible watermark image on an image-drawing region of the image data of the visible watermark pattern that is read out by the read-out section; and an adder section that adds visible/invisible watermark image data, on which the invisible watermark image is drawn by the invisible watermark generating section, to input image data.

According to another aspect of the present invention, there is provided an image forming apparatus comprising: an image input section that inputs an image; a memory section that stores image data that is input by the image input section; a detection section that detects, from the image data input by the image input section, watermark information; an image retrieval section that executes, on the basis of a detection result of the detection section, a retrieval as to whether the memory section stores image data or document data, which is substantially equal to the input image data; and an image forming section that forms an image on the basis of the image data input by the image input section or the image data stored in the memory section, in accordance with a retrieval result of the image retrieval section.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

Embodiments of the present invention will now be described with reference to the accompanying drawings.

Figure 1:
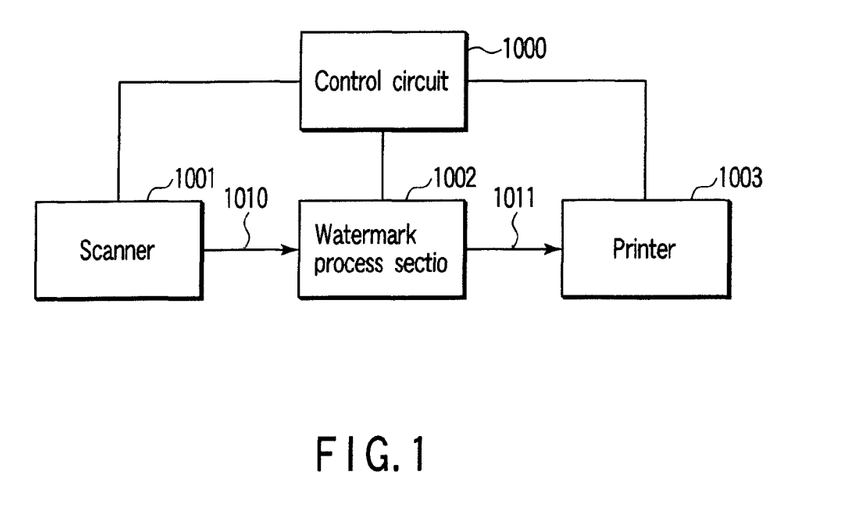
FIG. 1 schematically shows the structure of a digital multi-function peripheral according to a first embodiment.

FIG. 1 schematically shows the structure of a digital multi-function peripheral (MFP) according to a first embodiment of the invention. Specifically, the digital MFP comprises a scanner 1001 that inputs image data; a watermark process section 1002 that overlays a watermark on input image data 1010; a printer 1003 that prints image data 1011 overlaid with the watermark; and a control circuit 1000 that executes an overall control. The components, other than the watermark process section 1002, are those of a conventional digital MFP, so a description thereof is omitted.

Figure 2:
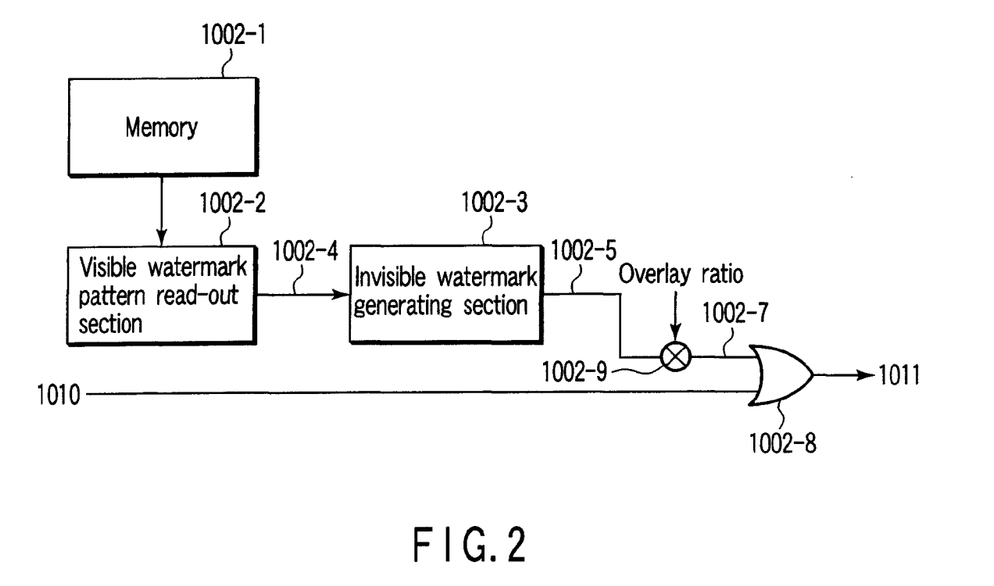
FIG. 2 is a block diagram that schematically shows the structure of a watermark process section.

FIG. 2 schematically shows the structure of the watermark process section 1002. The watermark process section 1002 comprises a memory 1002-1, a visible watermark pattern read-out section 1002-2, an invisible watermark generating section 1002-3, an adder section 1002-8, and a multiplier section 1002-9.

The memory 1002-1 stores a visible watermark pattern 1002-4.

The visible watermark pattern read-out section 1002-2 reads out the visible watermark pattern 1002-4 from the memory 1002-1.

The invisible watermark generating section 1002-3 generates an invisible watermark.

The adder section 1002-8 adds visible/invisible watermark image data 1002-7 and the input image data 1010, thereby generating watermark-overlaid image data 1011.

The multiplier section 1002-9 outputs watermark image data 1002-7 that is produced by multiplying image data 1002-5, which includes both a visible watermark and an invisible water, by an overlay ratio 1002-6 that is delivered from the control circuit 1000.

Figure 3:
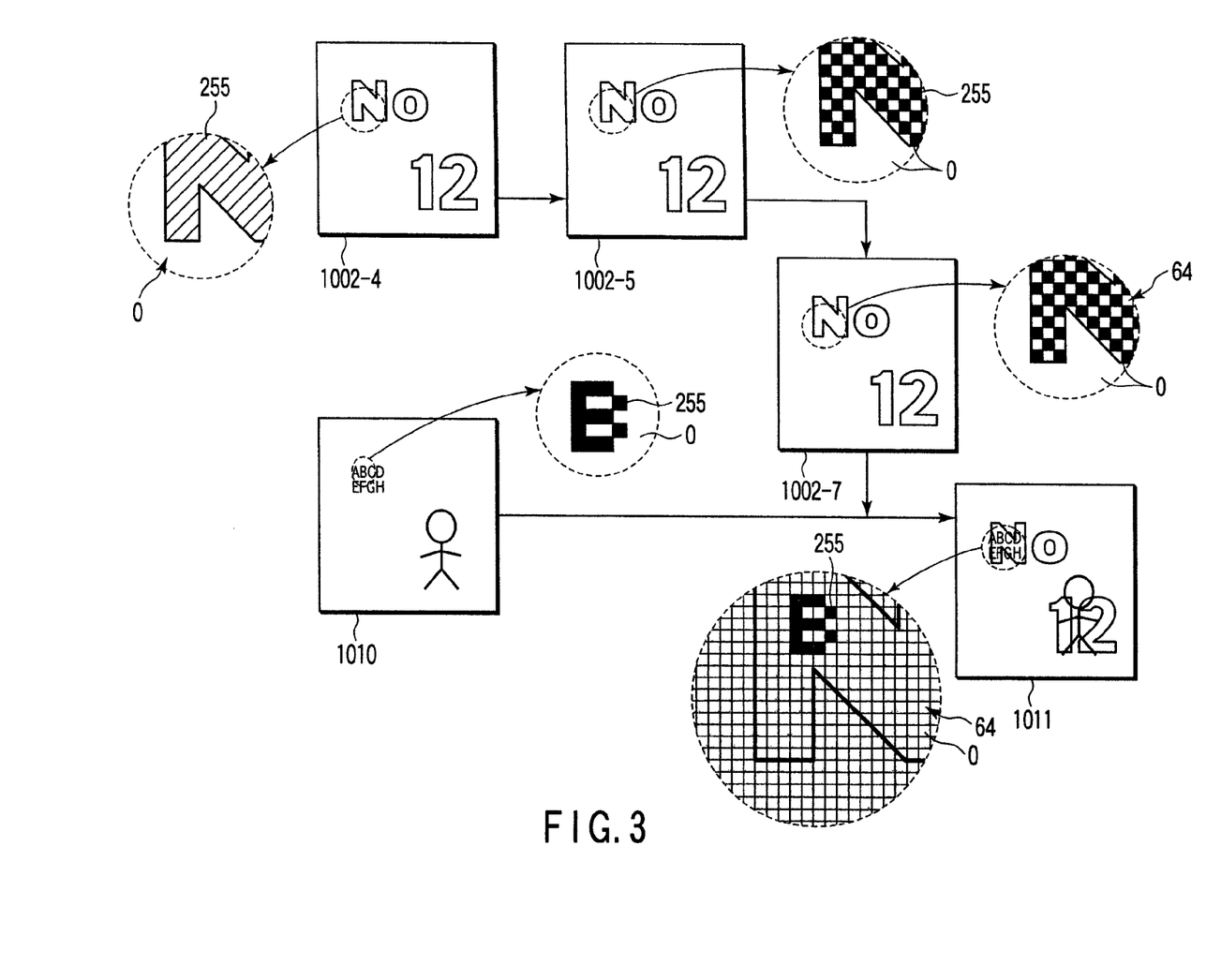
FIG. 3 shows an example of generated image data.

FIG. 3 shows an example of generated image data.

In FIG. 3, a visible watermark pattern represents a machine number "No 12", which is drawn with a pixel value 255. The invisible watermark generating section 1002-3 converts only the region that is drawn with the pixel value 255 to a cyclic pattern that corresponds to a specific code. The multiplier section 1002-9 multiplies the resultant data by an overlay ratio 1/4 that is delivered from the control circuit 1000, thus generating final visible/invisible watermark image data 1002-7. Subsequently, the adder section 1002-8 adds the final visible/invisible watermark image data 1002-7 to the input image data 1010, thereby generating image data 1011 on which the visible/invisible watermark is overlaid.

Figure 4:
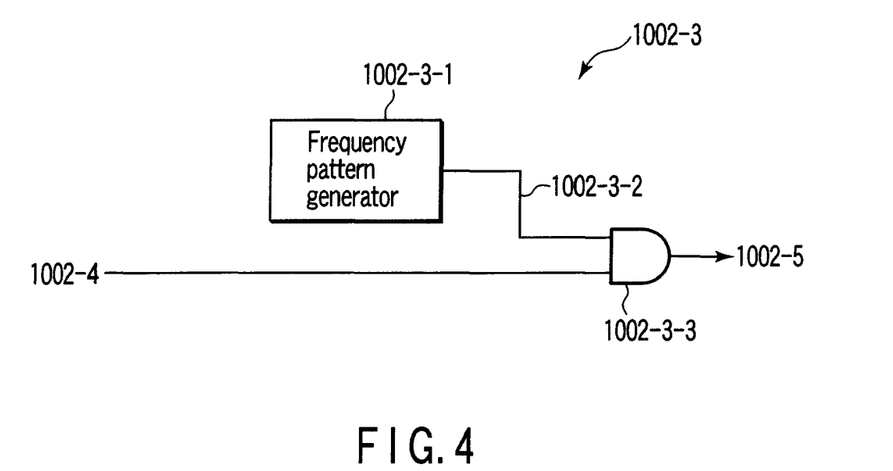
FIG. 4 shows an example of the structure of an invisible watermark generating section.

FIG. 4 shows an example of the structure of the invisible watermark generating section 1002-3. The invisible watermark generating section 1002-3 comprises a frequency pattern generator 1002-3-1 and a multiplier 1002-3-3. In the invisible watermark generating section 1002-3, the frequency pattern generator 1002-3-1 generates a frequency 1002-3-2 corresponding to a specific code (effective pixel 1, non-effective pixel 0), and the multiplier 1002-3-3 multiplies the frequency 1002-3-2 by the visible watermark pattern 1002-4. Thereby, an invisible watermark formed with the specific frequency is overlaid on the visible watermark pattern region.

As has been described above, according to the first embodiment, the machine number can be recognized on the input original without the feeling of interference. Even if there is a margin region, the invisible watermark can be overlaid on the visible watermark region.

In this embodiment, the invisible watermark is overlaid on the visible watermark image data, and then the image data is generated by the multiplication of the overlay ratio. Alternatively, from the beginning, visible/invisible watermark image data, which is obtained by multiplying the overlay ratio, may be prepared and stored in the memory 1002-1, and this visible/invisible watermark image data may be added to the input image data.

In addition, in this embodiment, the invisible watermark is overlaid only on the visible watermark region. Alternatively, the invisible watermark may be overlaid on an other effective image region (e.g. a photo region on which an invisible watermark is easily overlaid in general).

In the embodiment, the overlay of the watermark image data is simply added. Alternatively, the following arithmetic operation for what is called a semi-transparent process may be executed:

if(watermark pixel value≠0)

overlay result=watermark pixel value×α+original image pixel value×(1−α)

if(watermark pixel value=0)

overlay result=original image pixel value.

Figure 5:
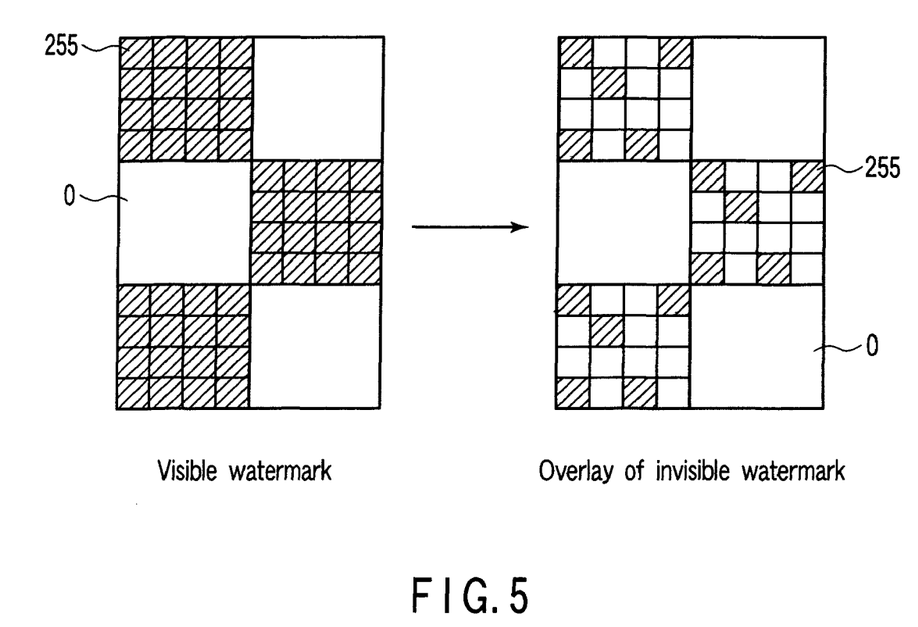
FIG. 5 shows an example of the structure of a visible watermark.

In this embodiment, the visible watermark is directly drawn by a to-be-drawn pattern itself. Alternatively, as shown in FIG. 5, the visible watermark may be drawn by a low-frequency pattern (4×4=1 unit in FIG. 5), and the invisible watermark may be overlaid.

Needless to say, the technique relating to the visible watermark/invisible watermark is not limited to the present embodiment. It is obvious that as regards the structure of the apparatus, each of the input device and output device may be constructed as a single unit.

Next, a modification of the first embodiment is described.

Figure 6:
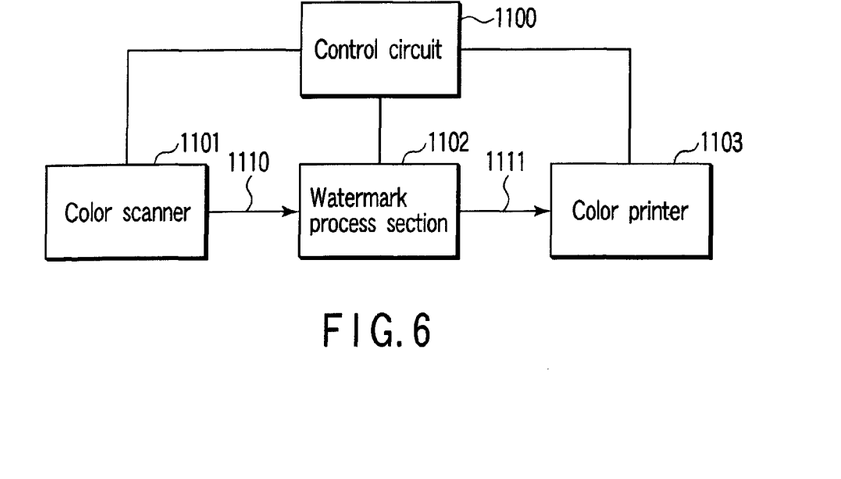
FIG. 6 shows a color digital multi-function peripheral, which is a modification of the first embodiment.

FIG. 6 shows a color digital multi-function peripheral according to a modification of the first embodiment. Specifically, the color digital MFP comprises a color scanner 1101 that inputs image data; a watermark process section 1102 that overlays a watermark on input image data 1110; a color printer 1103 that prints image data 1111 overlaid with the watermark; and a control circuit 1100 that executes an overall control. The components, other than the watermark process section 1102, are those of a conventional color digital MFP, so a description thereof is omitted.

Figure 7:
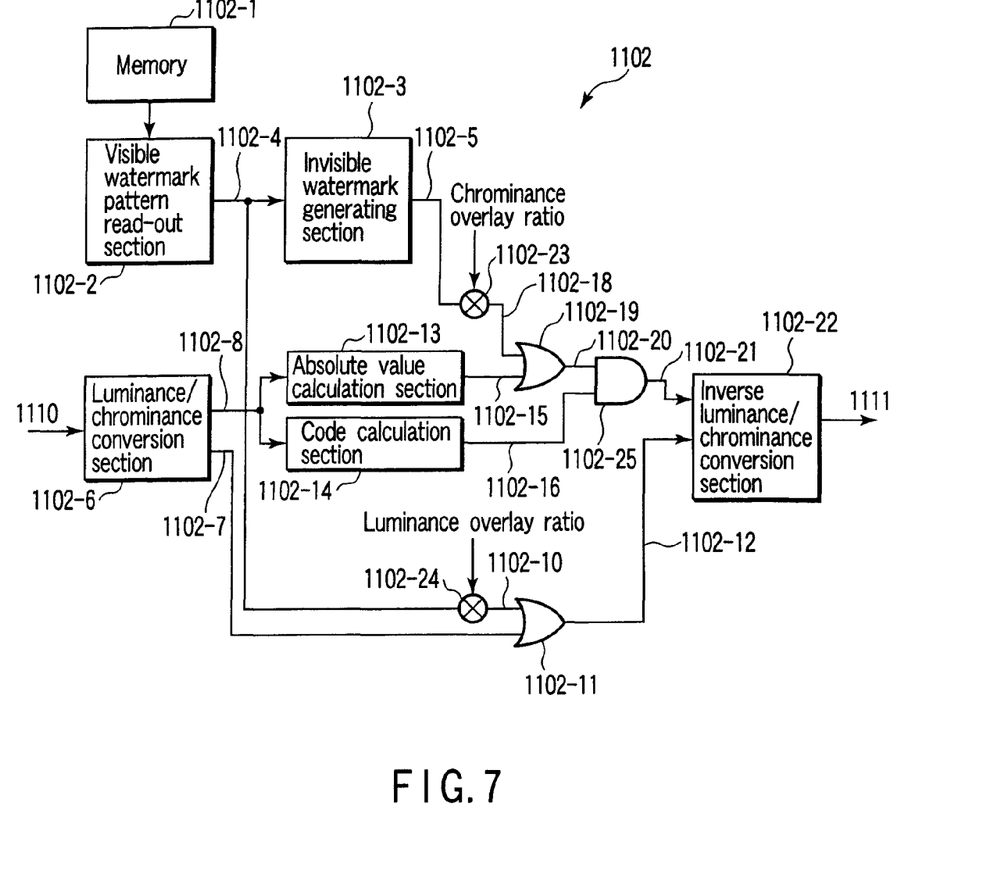
FIG. 7 is a block diagram that schematically shows the structure of a watermark process section.

FIG. 7 schematically shows the structure of the watermark process section 1102. The watermark process section 1102 comprises a memory 1102-1, a visible watermark pattern read-out section 1102-2, an invisible watermark generating section 1102-3, a luminance/chrominance conversion section 1102-6, an adder section 1102-11, an absolute value calculation section 1102-13, a code calculation section 1102-14, an adder section 1102-19, an inverse luminance/chrominance conversion section 1102-22, a multiplier section 1102-23, a multiplier section 1102-24, and a multiplier section 1102-25.

The memory 1102-1 that stores the visible watermark pattern, the visible watermark pattern read-out section 1102-2 that reads out visible watermark pattern 1002-4 from the memory 1102-1, and the invisible watermark generating section 1102-3 that generates an invisible watermark are the same as in the first embodiment. Thus, a description of these components is omitted.

Color image data 1110 is separated by the luminance/chrominance conversion section 1102-6 into a luminance signal 1102-7 and a chrominance signal 1102-8.

The adder section 1102-11 adds the luminance signal 1102-7 and visible watermark image data 1102-10 that is produced by multiplying the visible watermark pattern 1002-4 by a luminance overlay ratio 1102-9 that is delivered from the control circuit 1100. As a result, a visible-watermark-overlaid luminance signal 1102-12 is generated.

The chrominance signal 1102-8 is delivered to the absolute value calculation section 1102-13 and code calculation section 1102-14. The absolute value calculation section 1102-13 generates a chrominance absolute value 1102-15, and the code calculation section 1102-14 generates a code 1102-16.

The multiplier section 1102-23 multiplies invisible watermark image data 1102-5 from the invisible watermark generating section 1102-3 by a chrominance overlay ratio 1102-17 that is delivered from the control circuit 1100. As a result, invisible watermark image data 1102-18 is generated.

The adder section 1102-19 adds the invisible watermark image data 1102-18 and the chrominance absolute value 1102-15, and outputs a signal 1102-20. The multiplier section 1102-25 multiplies the code 1102-16 by the signal 1102-20, and generates an invisible-watermark-overlaid chrominance signal 1102-21.

The inverse luminance/chrominance conversion section 1102-22 executes inverse conversion of the visible-watermark-overlaid luminance signal 1102-12 and invisible-watermark-overlaid chrominance signal 1102-21, and generates visible/invisible-watermark-overlaid image data 1111. Actually, two chrominance signals are generated, but only one chrominance signal is described for the purpose of simple description.

As has been described above, according to the modification of the first embodiment, the invisible watermark information is overlaid on the chrominance image data that is more difficult to perceive. Therefore, the quality of output image data is enhanced.

In addition, in this embodiment, the visible watermark image data is described as a simple pattern. However, needless to say, if the visible watermark image data is generated in color, an invisible watermark can more easily be overlaid on a substantially monochromatic document.

In the embodiment, the visible watermark and invisible watermark are separately overlaid on the luminance signal and chrominance signal. If both the visible watermark and invisible watermark are overlaid on the chrominance signal alone, it becomes possible to obtain image data, which can reduce the feeling of interference that is caused on the original due to the visible watermark.

As regards color printer image data that is printed in cyan, magenta and yellow (CMY) or cyan, magenta, yellow and black (CMYK), it is possible to overlay both the visible and invisible watermarks on a yellow signal that is difficult to perceive.

Next, a second embodiment is described.

Figure 8:
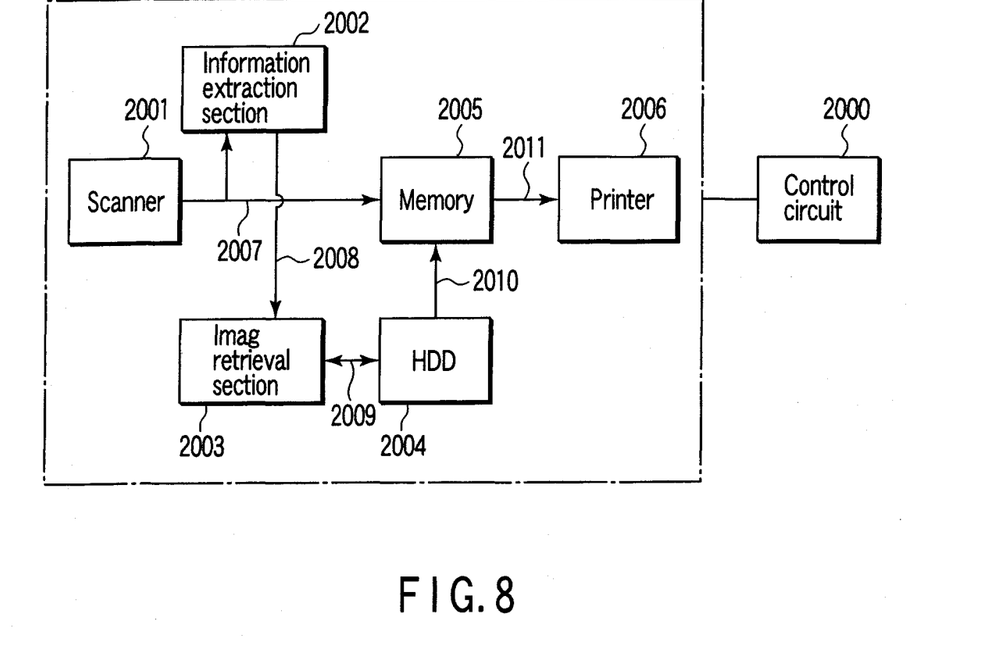
FIG. 8 shows a digital multi-function peripheral according to a second embodiment.

FIG. 8 shows a digital multi-function peripheral according to the second embodiment. The digital MFP comprises a scanner 2001 that inputs image data; an information extraction section 2002 that extracts information 2008 from input image data 2007; an image retrieval section 2003 that retrieves an image from a hard disk drive (HDD) 2004 on the basis of the extracted information 2008; a memory 2005 that stores the input image data 2007 and retrieved image data 2010; a printer 2006 that prints the input image data or the retrieved image data; and a control circuit 2000 that executes an overall control. The structural components, other than the information extraction section 2002, are those of a conventional digital multi-function peripheral, so a description thereof is omitted.

Figure 9:
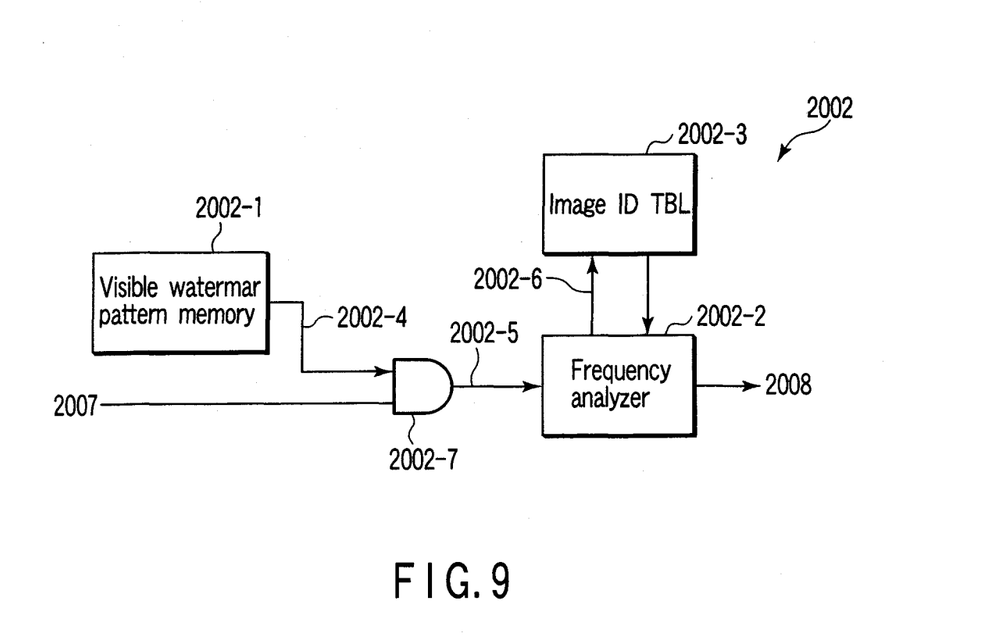
FIG. 9 schematically shows the structure of an information extraction section.

FIG. 9 schematically shows the structure of the information extraction section 2002. The information extraction section 2002 comprises a visible watermark pattern memory 2002-1, a frequency analyzer 2002-2, an image ID-TBL 2002-3, and a multiplier section 2002-7.

To begin with, the multiplier section 2002-7 multiplies a visible watermark pattern 2002-4, which is read out from the visible watermark pattern memory 2002-1, by input image data 2007. The frequency analyzer 2002-2 with a conventional architecture analyzes image data 2002-5 that is a multiplication result. In addition, the frequency analyzer 2002-2 retrieves an extracted frequency pattern 2002-6, which is an analysis result, using the image data ID-TBL 2002-3, and outputs the extracted information 2008 that is a retrieval result.

Figures 10A, 10B:
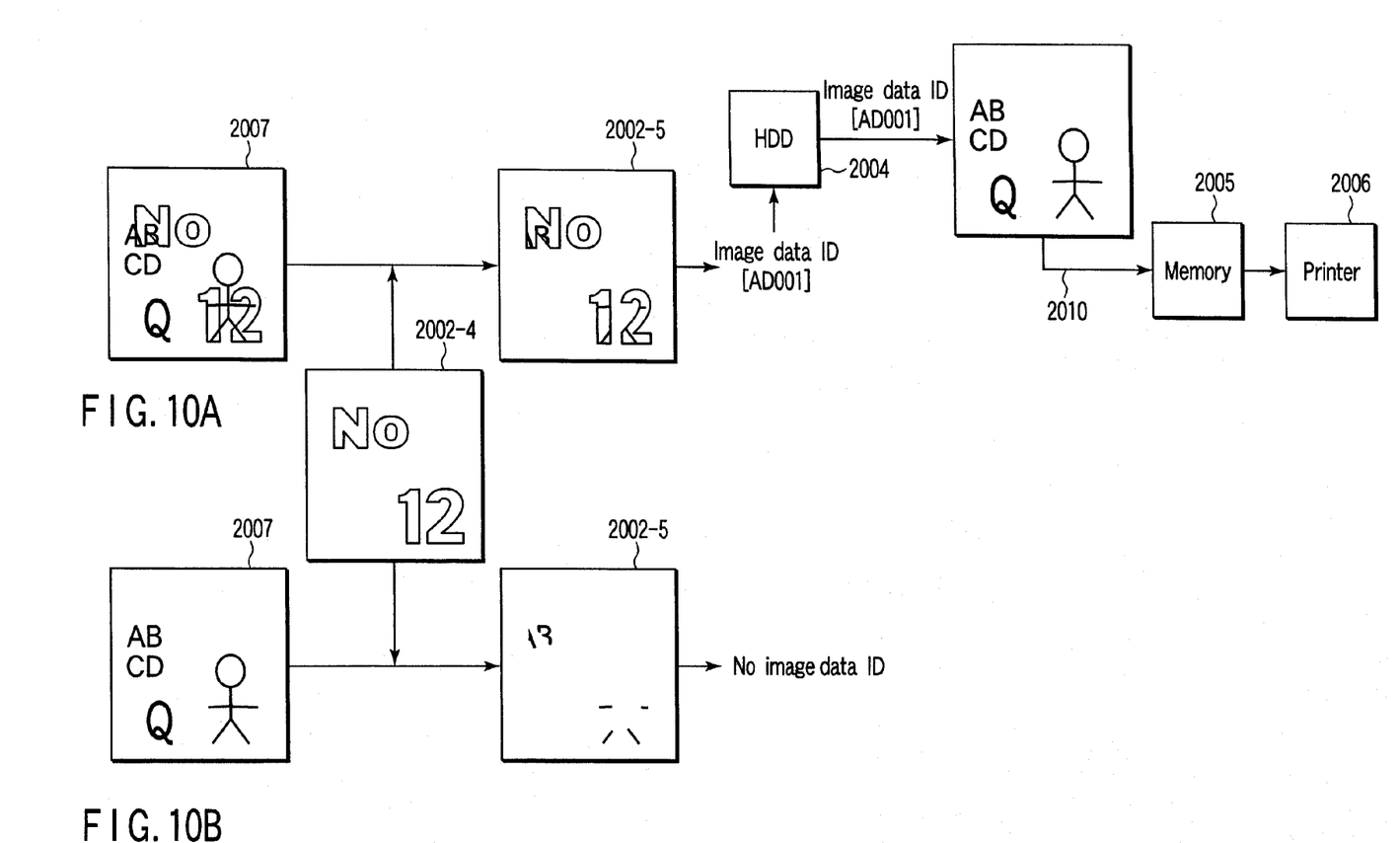
FIG. 10A illustrates an outline of an information extraction operation.
FIG. 10B illustrates an outline of an information extraction operation.

FIGS. 10A and 10B illustrate the outline of the above-described operation.

FIG. 10A shows input image data 2007 of an original on which a visible/invisible watermark is overlaid. In this case, the input image data 2007 is multiplied by a visible watermark pattern 2002-4, and image data 2002-5, which contains only the visible watermark region, is generated. Although this image data includes a pattern of the input image data, the amount of information of invisible watermark image data is large. Thus, the frequency analyzer 2002-2 can easily extract a specific frequency 2002-6, and an image data ID (e.g. AD001) can be output at high speed with high precision.

FIG. 10B shows input image data 2007 of an original on which a visible/invisible watermark is not overlaid. In this case, image data 2002-5, which contains only an input original pattern of the visible watermark pattern region, is generated. Since the frequency analyzer 2002-2 is unable to specify a frequency, information that indicates the absence of an image data ID is output.

In the case of FIG. 10A, the image data of the image data ID is read out from the HDD 2004 and stored in the memory 2005. The image data is then output from the printer 2006.

In the case of FIG. 10B, since an image data ID is absent, the input image data 2007 is directly read out from the memory 2005 and output from the printer 2006.

As has been described above, according to the second embodiment, image data retrieval is executed using image data on which a visible/invisible watermark is overlaid. Thereby, an invisible watermark region can easily be discriminated, and image data can be retrieved at high speed with high precision.

In this embodiment, the visible watermark/invisible watermark is used in cooperation with the image data retrieval system, and the convenience is enhanced. Patterns, which are much smaller in number than document image data, are used for the visible watermark information such as a machine number, and various information, such as image data ID, is used for the invisible watermark. Thereby, high-speed retrieval is enabled in the entire system.

In general, the place where the image input/output apparatus is installed is not greatly changed, and the image input/output apparatus, in most cases, is used in units of a group such as a section or a department. Thus, if the machine number can be specified at the time of retrieving the visible watermark pattern and if the image data ID is retrieved in combination with the information of the machine number, the retrieval can be executed at higher speed and higher precision.

In this embodiment, information is not particularly encrypted. It is possible, however, to encrypt both visible and invisible watermark information and to bury the encrypted information, or to bury the visible watermark in a non-encrypted form and the invisible watermark in an encrypted form. In the latter case, if selective use is made of public information and non-public information, it becomes possible to select the management information level between analog management (e.g. management of print-out matters such as personal filing, and management in a simple personal directory) and digital management (e.g. electronic file management of large-scale databases in units of a department, etc.).

In this embodiment, the visible watermark image data is simply multiplied. However, if there are a plurality of visible watermark patterns that can be input in the system, the degree of coincidence of multiplication may be found with respect to each of the visible watermark patterns, or optimization, such as discrimination based on the degree of extraction of the invisible watermark, may be executed in accordance with the system. The visible/invisible watermark information extraction method is not limited to the present embodiment.

In the embodiment, different information items are applied to the visible and invisible watermarks. Alternatively, the same information may be applied to both watermarks, and the precision in extraction may be made higher than in the prior art.

Next, a third embodiment is described.

Figure 11:
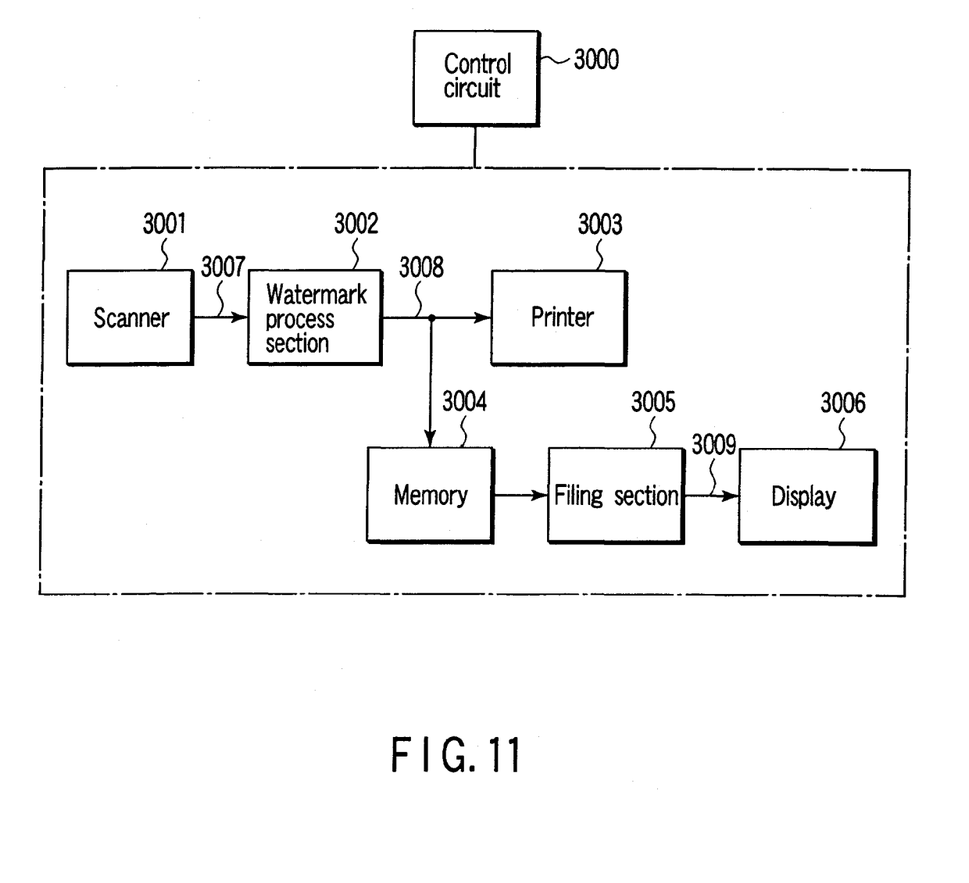
FIG. 11 shows a digital multi-function peripheral according to a third embodiment.

FIG. 11 shows a digital multi-function peripheral according to the third embodiment. The digital MFP comprises a scanner 3001 that inputs image data; a watermark process section 3002 that subjects input image data 3007 to a watermark process; a printer 3003 that prints watermark-processed image data 3008; a memory 3004 that stores data; a filing section 3005 that files data stored in the memory 3004; a display 3006 that displays file data 3009 as an image; and a control circuit 3000 that executes an overall control. The structural components, other than the watermark process section 3002, are those of a conventional digital multi-function peripheral, so a description thereof is omitted.

Figure 12:
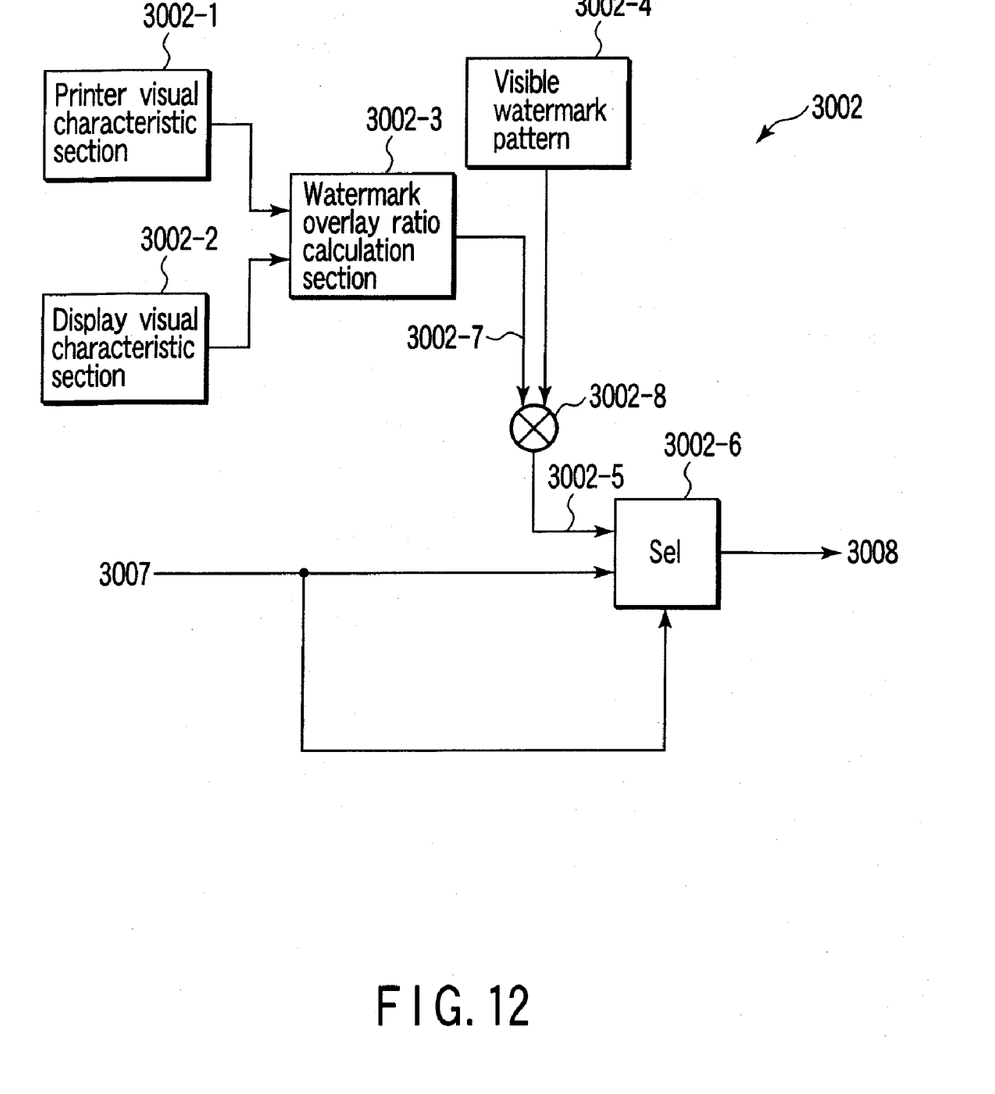
FIG. 12 is a block diagram that schematically shows the structure of a watermark process section.

FIG. 12 schematically shows the structure of the watermark process section 3002. The watermark process section 3002 comprises a printer visual characteristic section 3002-1, a display visual characteristic section 3002-2, a watermark overlay ratio calculation section 3002-3, a visible watermark pattern section 3002-4, a selector 3002-6, and a multiplier section 3002-8.

The watermark overlay ratio calculation section 3002-3 of the watermark process section 3002 calculates a watermark overlay ratio 3002-7 on the basis of outputs from the printer visual characteristic section 3002-1 and display visual characteristic section 3002-2.

The multiplier section 3002-8 multiplies a visible watermark pattern from the visible watermark pattern section 3002-4 by the watermark overlay ratio 3002-7, thereby calculating visible watermark image data 3002-5.

The selector 3002-6 selects the visible watermark image data 3002-5 when an input pixel value is 0 (i.e. white), and selects the input image data 3007 when the input pixel value is non-0. The selector 3002-6 outputs the selected data as watermark-processed image data 3008.

In short, visible watermark image data is drawn on only the white region of the input image data.

In general, a display can stably execute high-resolution display. Thus, 1-pixel information is directly drawn with 256 values for 1 pixel. On the other hand, a printer has a lower resolution than the display, and cannot stably execute printing. Thus, pixel values of several pixels, which are grouped as 1 unit, are drawn. Besides, the display adopts density modulation, and the density of each picture dot is actually varied on a dot-by-dot basis. On the other hand, the printer adopts area coverage modulation, and toner or ink that forms a picture dot becomes ON/OFF reproduction on paper.

Accordingly, the relationship in device resolution is generally given by: printer >display. Although resolutions are different, reproduction is executed so that the density per unit area may coincide. However, since these display devices are different ones, a difference occurs in characteristics associated with human sensation, such as contrast relative to white (white paper, white display color).

For example, even when image data with a level of about 20 on the entire surface (white=level 0) is displayed, the image data is simply viewed as white. However, if the image data is printed, an impression of overlay of noise is given. As mentioned above, since the display is based on density modulation, image data with a level of about 20 on the entire surface is displayed as such, and discernment between white and somewhat noisy white is not possible since the human sensation is a relative one. On the other hand, the printer is based on area coverage modulation, and a mass of toner is placed on paper at predetermined intervals. Consequently, a white part on paper and a toner region are discerned (each region is not always discerned), and an impression of noise is given.

Thus, based on the display visual characteristic section 3002-2 and printer visual characteristic section 3002-1, a level value, at which a white region is not relatively easily perceptible as white on the display but is perceptible on print, is found, and the watermark overlay ratio 3002-7 is calculated.

For example, when a white-perceptible value is 20 or more in display visual characteristics and is 10 or more in printer visual characteristics, the watermark overlay ratio calculation section 3002-3 calculates the watermark overlay ratio:

watermark overlay ratio=((display discernment threshold−printer discernment threshold)÷2+printer discernment threshold)÷255=((20−10)÷2+10)÷255≈6%.

Figure 13:
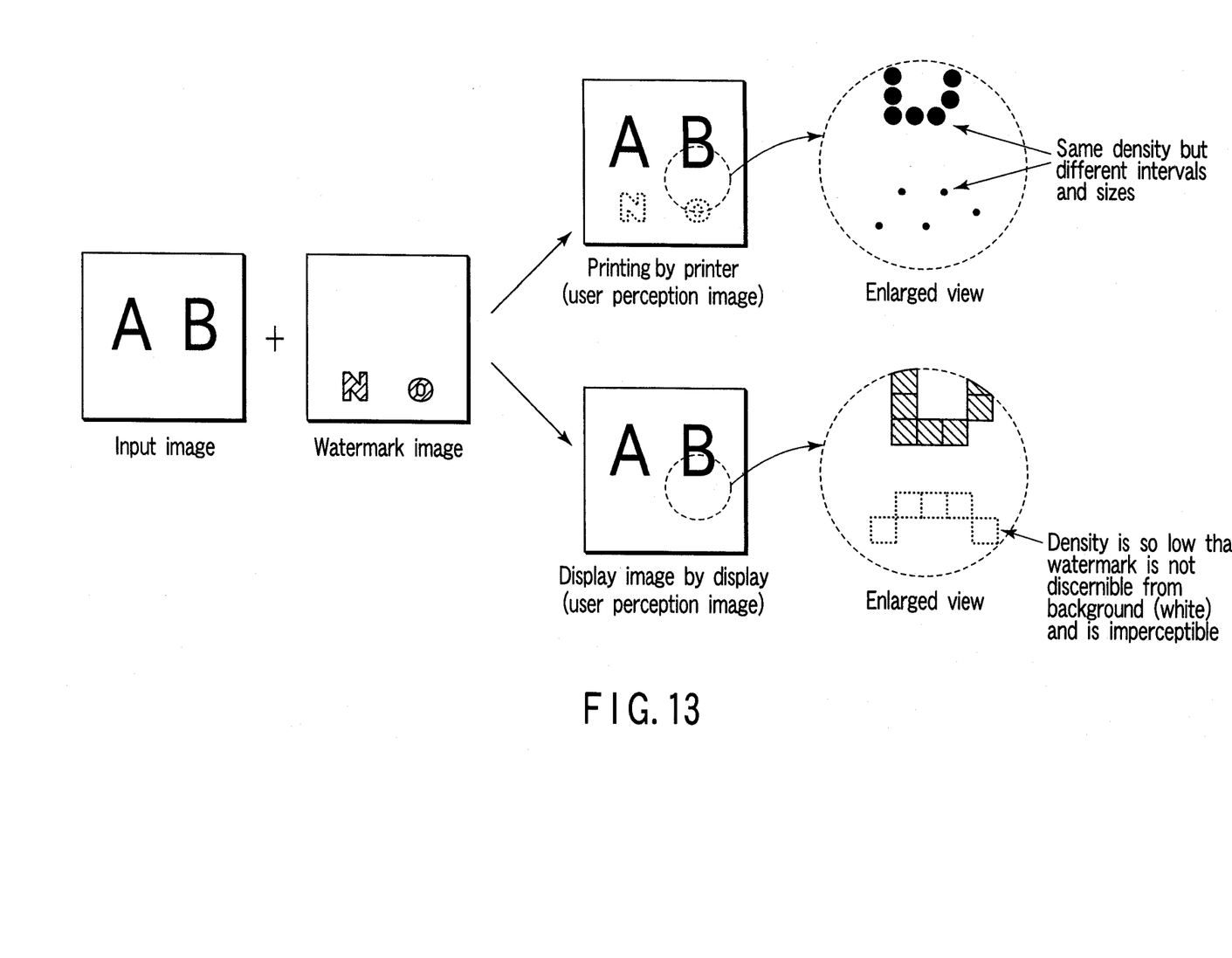
FIG. 13 shows an image that is drawn on the basis of a watermark overlay ratio.

FIG. 13 shows an image that is drawn on the basis of a watermark overlay ratio. In FIG. 13, a watermark image is overlaid on an input image with the above-mentioned calculated watermark overlay ratio. As a result, on a print-out image of the printer, the watermark image is perceptible, as shown in enlarged scale, since the dots have the same density but have different intervals and sizes. On the other hand, on a display image by the display, as shown in enlarged scale, the density of the watermark image is so low that the watermark image is not discernible from the background (white) and is imperceptible.

As has been described above, the third embodiment can provide a system wherein a watermark with a density based on characteristics is simply directly drawn on image data. Thereby, without particularly switching the presence/absence of overlay of a watermark between printing and display, the watermark can be made visible in print and made invisible in display. For example, image data can be made freely accessible on the display, while the image data can be managed in printing with psychological restraint due to the perception of the watermark.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   an image input section configured to input an image;
   a memory section configured to store a visible watermark image, which is visible on a recording medium and invisible on a copied paper sheet;
   a generating section configured to draw an invisible watermark image in the visible watermark image read from the memory section to generate a visible/invisible watermark image;
   an overlaying section configured to overlay the visible/invisible watermark image generated by the generating section on the image input by the image input section by a predetermined overlay ratio and generate an overlaid image; and
   a forming section configured to form an image on the recording medium based on the overlaid image;
   wherein the predetermined overlay ratio is a value configured to make the visible/invisible watermark image visible on the copied paper sheet, and invisible when displayed on a display device based on the image overlaid by the overlaying section, wherein the value is greater than or equal to A/M and smaller than B/M, where A is a minimum gradation of allowing the image to be distinguished as white in a printer visual characteristic, B is a minimum gradation of allowing the image to be distinguished as white in a display visual characteristic, and M is the maximum gradation.

2. The image forming apparatus according to claim 1, wherein the visual watermark pattern of the image data, which is stored in the memory section, is overlaid on a luminance component, and the visible/invisible watermark image, which is drawn by the invisible watermark generating section, is overlaid on a chrominance component.

3. The image forming apparatus according to claim 1, wherein, in the forming section, the visible watermark is non-encrypted information, and the invisible watermark is encrypted information.

4. An image forming method comprising:
   inputting an image;
   reading, from a memory area, a visible watermark image, which is visible on a recording medium and invisible on a copied paper sheet;
   drawing an invisible watermark image in the visible watermark image to generate the visible/invisible watermark image;
   overlaying the generated visible/invisible watermark image on the input image by a predetermined overlay ratio to generate an overlaid image; and
   forming an image on the recording medium based on the overlaid image;
   wherein the predetermined overlay ratio is a value configured to make the visible/invisible watermark image visible on the copied paper sheet, and invisible when displayed on display a display device based on the image overlaid by the overlaying step, wherein the value is greater than or equal to A/M and smaller than B/M, where A is a minimum gradation of allowing the image to be distinguished as white in a printer visual characteristic, B is a minimum gradation of allowing the image to be distinguished as white in a display visual characteristic, and M is the maximum gradation.

5. The method according to claim 4, wherein the visual watermark pattern of the image data, which is stored in the memory section, is overlaid on a luminance component, and the visible/invisible watermark image, which is drawn by the invisible watermark generating section, is overlaid on a chrominance component.

6. The method according to claim 4, wherein the visible watermark is non-encrypted information and the invisible watermark is encrypted information.

* * * * *